B. H. PICKETT.
BELT GUIDE AND THROWING DEVICE.
APPLICATION FILED AUG. 16, 1913.
1,116,478.
Patented Nov. 10, 1914.
2 SHEETS—SHEET 1.
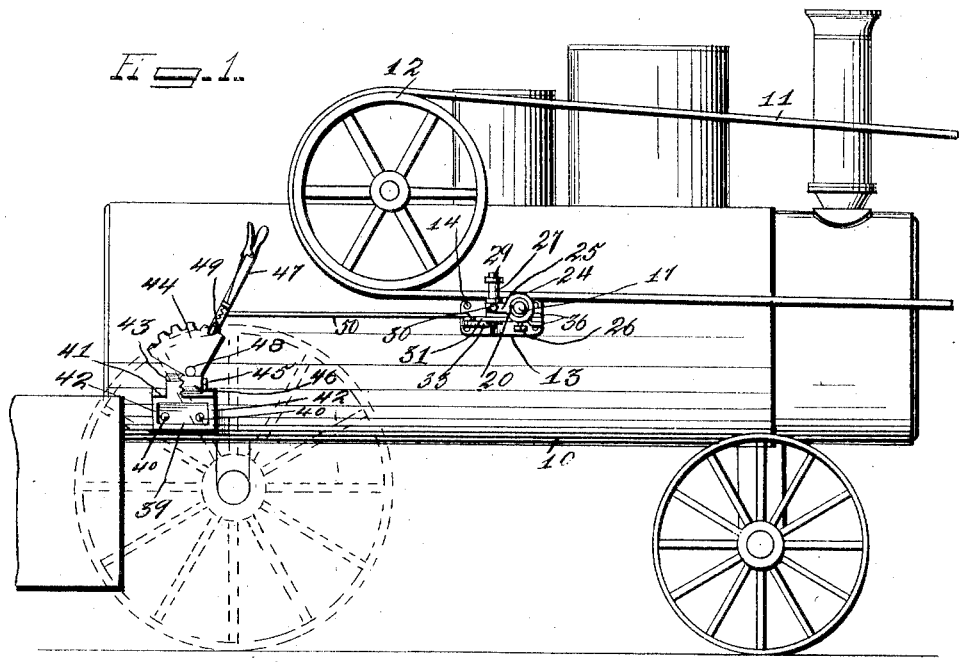
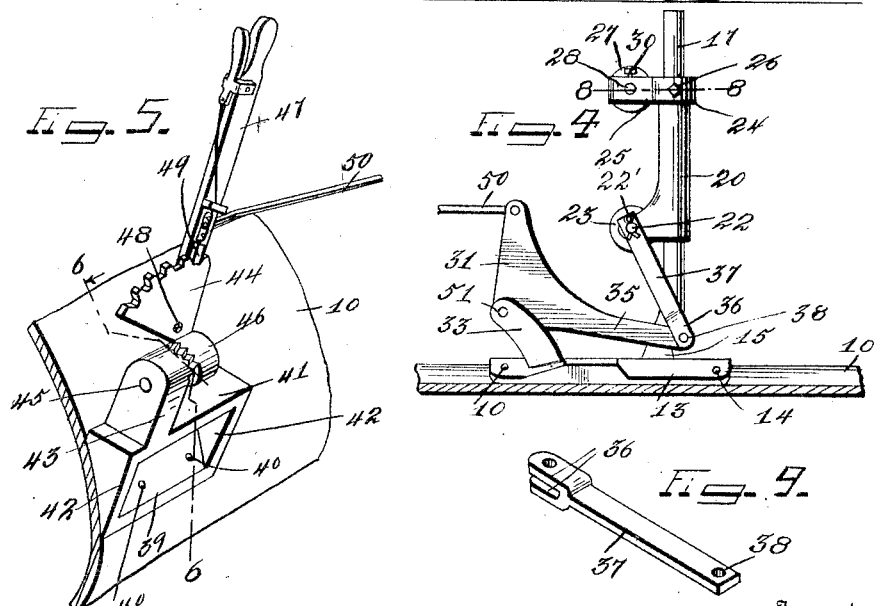
Inventor
Benjamin H. Pickett
Witnesses
By E. E. Grooman
his Attorney

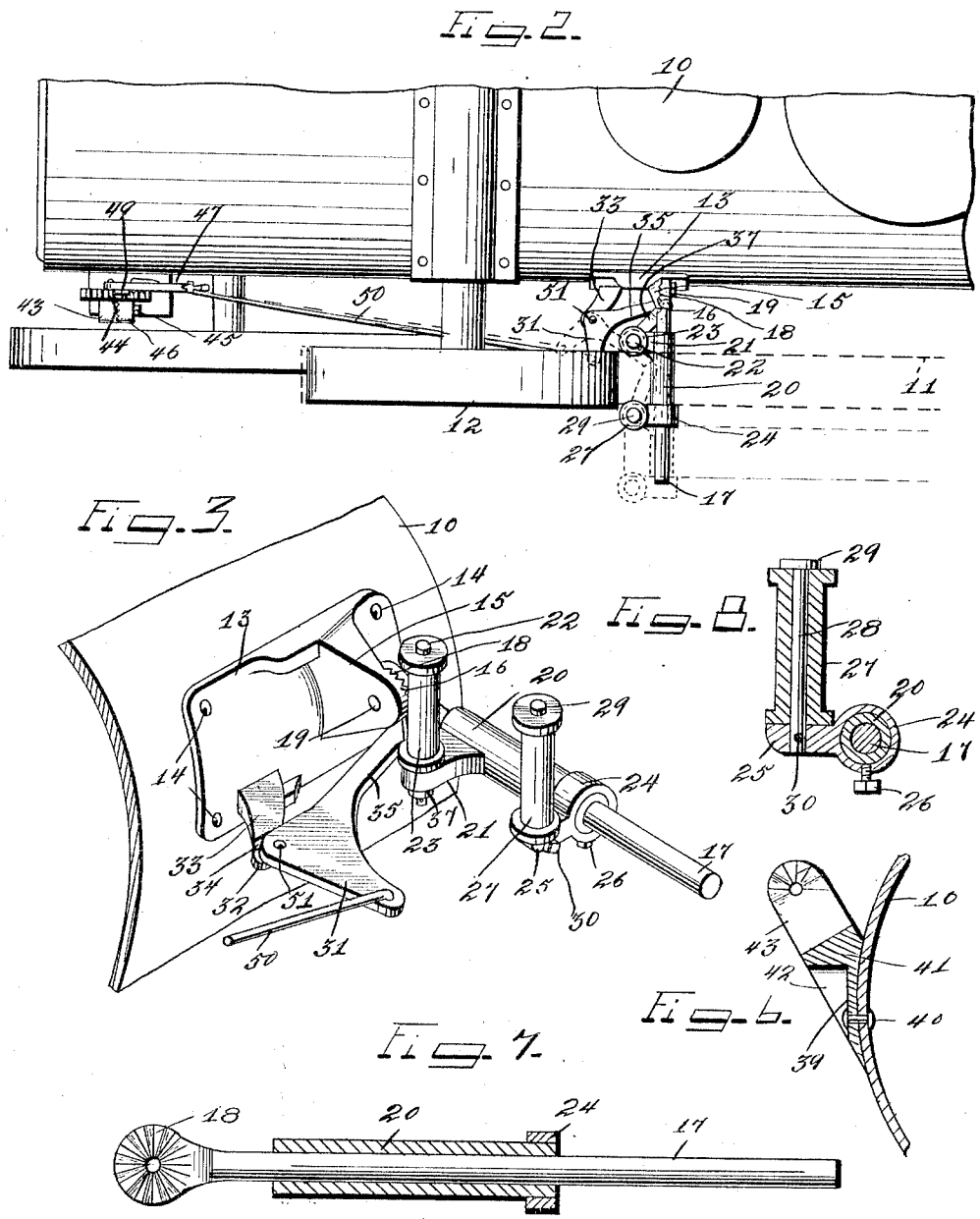

UNITED STATES PATENT OFFICE.

BENJAMIN H. PICKETT, OF BINFORD, NORTH DAKOTA.

BELT GUIDE AND THROWING DEVICE.

1,116,478.  Specification of Letters Patent.  Patented Nov. 10, 1914.

Application filed August 16, 1913. Serial No. 785,176.

*To all whom it may concern:*

Be it known that I, BENJAMIN H. PICKETT, a citizen of the United States, residing at Binford, in the county of Griggs and State of North Dakota, have invented certain new and useful Improvements in Belt Guide and Throwing Devices, of which the following is a specification, reference being had therein to the accompanying drawing.

This invention relates to an engine attachment and the principal object of the invention is to provide an engine attachment for a traction engine by means of which the belt may be disconnected from the fly wheel.

Another object of the invention is to so construct the attachment that it may be connected with any engine regardless of the angle to which the sides of the engine are pitched.

Another object of the invention is to so construct the device that it may be adjusted to fit the width of any belt used.

With these and other objects in view this invention consists of certain novel combinations, constructions and arrangements of parts as will be hereinafter fully described and claimed.

This invention is illustrated in the accompanying drawings, wherein:

Figure 1 is a side elevation of the traction engine provided with the improved belt shifting mechanism. Fig. 2 is a fragmentary top plan view of the engine provided with an improved belt shifting means. Fig. 3 is a perspective view of the belt shifting mechanism. Fig. 4 is a bottom plan view of the belt shifting mechanism, shown in Fig. 3. Fig. 5 is a perspective view of the lever for operating the shifting mechanism. Fig. 6 is a sectional view through the operating mechanism, shown in Fig. 5 and taken along the line 6—6. Fig. 7 is a view showing the arm upon which the belt engaging means is slidably mounted, the sleeve which is mounted upon the arm being shown in section. Fig. 8 is a section along the line 8—8 in Fig. 4. Fig. 9 is a perspective view of the link which connects the sliding sleeve with the belt crank.

This invention is intended to be used in connection with the boiler of the traction engine 10 and is intended to provide means whereby the belt 11 may be guided while traveling around the fly wheel 12 and readily disconnected from the fly wheel when desired.

This invention is provided with a base plate 13 which is preferably curved, as shown in Fig. 3 and secured to the side of the boiler by rivets 14 extending through the corners of the plate. An arm 15 extends from one end portion of the plate 13 and is provided with a clutch head 16. A rod 17 extends from the arm 15 and is provided with an enlarged head 18 at its inner end, which head 18 forms a clutch head which is adjustably connected to the clutch head 16 with the pivot pin 19. By this means the rod 17 may be held at any desired angle so that the rod may be at the proper angle no matter at what angle the sides of the boiler extend.

A sleeve 20 is slidably mounted upon the rod 17 and is provided with a supporting arm 21 which extends from its inner end and forms a support for the axle 22 of the roller 23. A ring 24 which carries an arm 25 is mounted upon the outer end of the sleeve and is adjustably held in place by means of the set-screw 26 so that the ring may be moved upon the sleeve according to the width of the belt which passes around the fly wheel. A secondary roller 27 is rotatably mounted upon the axle 28. This axle 28 is provided with the enlarged head 29 which prevents the removal of the roller 27 and is connected to the arm 25 by means of the pin 30 passing through the arm 25 and lower end of the axle 28. From an inspection of Figs. 3 and 8 it will be readily seen that this ring 24 can be very readily adjusted upon the sleeve 20 and that therefore, the distance between the rollers 23 and 27 can be regulated so that the rollers will engage the edges of the belt passing between them, thus guiding the belt and preventing the same from moving to one side and slipping from the fly wheel.

A bell-crank lever 31 is pivotally mounted upon the reduced end 32 of the supporting arm 33 and limits the pivotal movement in one direction by the shoulder 34 at the inner end of the reduced end 32. This bell-crank lever has one arm 35 extended as shown in Fig. 4 and has its end portion pivotally mounted between the forks 36 at the inner end of the link 37. This link 37 has its outer end portion provided with opening 38 through which the lower end of the axle 22 passes. This link is held in connection with the axle by means of the key 22', and it will be readily seen that when the bell crank lever moves, it will move the sleeve from one end of the rod 17 to the other. By shifting this sleeve from the inner end of the rod 17 and the outer end, the belt will be drawn away from the boiler and will thus be disconnected from the fly wheel 12.

A bracket 39 is secured to the rear end of the boiler by means of the rivets 40 and is provided with an upper flange 41 which is supported by the webs 42 and carries an upstanding arm 43 which arm 43 is provided with a clutch face shown in Fig. 6. A rack 44 is pivotally connected with the arm 43 by means of a pin 45 which pin passes through the sleeve 46 at the base of the rack 44. This sleeve 46 is provided with a clutch face which engages the teeth of the clutch face and adjustably connects the rack with the arm 43 so that the rack will be held at the desired angle irrespective of the pitch of the boiler face. A latch lever 47 is pivotally connected with the rack by means of the pivot pin 48 and is provided with a latch 49 which engages the teeth of the rack so that the lever may be held in an adjusted position. A rod 50 connects the latch lever with the bell-crank lever and from an inspection of the drawings and particularly Fig. 2, it will be readily seen that when the latch lever is moved, the bell-crank lever will be rocked upon this pivot pin 51, thus causing the sleeve 20 to be moved upon the rod 17.

A device has therefore been provided which may be readily connected with any boiler irrespective of the slope of the outer face of the boiler, and which may be used with a belt of any width.

What is claimed is:

1. An attachment of the character described comprising a supporting plate, a rod extending from said plate and adjustably connected therewith, a bell-crank lever pivotally connected with said plate, a sleeve slidably mounted upon said rod, an arm carried by said sleeve, a roller, an axle for said roller passing through said arm, a link connecting the lower end of said axle with the end of said arm, a bracket carried by said sleeve, a roller rotatably connected with said bracket, and means for rocking said bell-crank lever.

2. An attachment of the character described comprising a supporting plate, a rod extending from said supporting plate, a belt shifting means mounted upon said rod, a bell-crank lever pivotally connected with said plate and connected with said belt shifting means, a second supporting plate, an arm extending above said second supporting plate and provided with a clutch face, a rack, a sleeve carried by said rack and provided with a clutch face, a pin pivotally connecting said sleeve with said arm whereby the clutch faces of said sleeve and arm will interlock to hold said rack in an adjusted position, a latch pivotally connected with said rack, and a means connecting said latch lever with said bell-crank lever whereby the movement of said latch lever will rock said bell-crank lever.

3. An attachment of the character described comprising a plate, an arm formed upon said plate adjacent its outer portion, a rod adjustably secured to said arm, a sleeve slidably mounted upon said rod, a supporting arm formed upon said sleeve and extending from one side thereof, a vertical roller rotatably mounted upon said supporting arm of said sleeve, an annular ring adjustably secured upon said sleeve, a roller rotatably mounted upon said ring and adapted to be moved toward said supporting arm of said sleeve when desired for adjusting the space between said rollers, said rollers provided with upper and lower guiding flanges whereby a belt passing between said rollers will be limited in its upward or downward movement by said flanges and will thereby be held in engagement with said rollers, a bell-crank lever pivotally secured upon said plate, said bell-crank lever secured to the inner portion of said sleeve, said bell-crank lever extending under said integral arm of said plate, whereby said bell-crank lever may be easily swung without interference from said arm, said bell-crank lever adapted to move said sleeve upon said rod, and means engaging said bell-crank lever for swinging the same and holding the same in a set position.

4. In an attachment of the character described the combination with a plate, an enlarged supporting arm formed upon the upper portion of said plate, an elongated supporting arm formed upon the lower portion of said plate at a spaced distance below the lower portion of said first-mentioned arm, a rod adjustably secured to said first-mentioned arm, a sleeve slidably mounted upon said rod, a plurality of rollers rotatably mounted upon said sleeve, said elongated supporting arm provided with a cut-out portion at its outer end and thereby forming an abutting shoulder, a bell-crank lever pivotally secured upon the outer portions of said bell-crank supporting arm, a link pivotally secured to said sleeve, said bell-crank lever pivotally secured to the free end of said link, said bell-crank lever adapted to shift said sleeve upon said rod, said abutting shoulder adapted to limit the movement of said bell-crank lever in one direction thereby preventing the sleeve from moving inwardly beyond a certain extent, thereby preventing the rollers from moving to an inoperative position, and means for operating said bell-crank lever.

In testimony whereof I hereunto affix my signature in presence of two witnesses.

BENJAMIN H. PICKETT.

Witnesses:
ARTHUR PAYNE,
ORION E. RHODES.

Copies of this patent may be obtained for five cents each, by addressing the "Commissioner of Patents, Washington, D. C."